April 5, 1960 R. M. DWYER ET AL 2,931,408
ATTACHMENT FOR REFRIGERATING A MEAT CHOPPER
Filed March 13, 1957 2 Sheets-Sheet 1
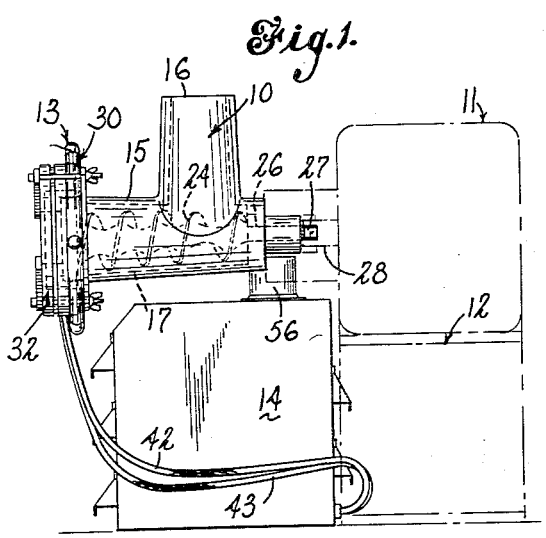
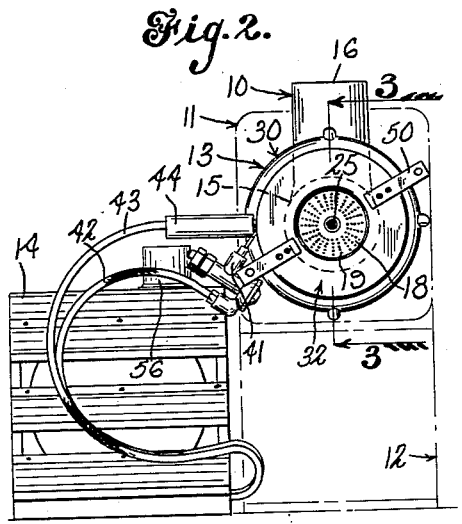
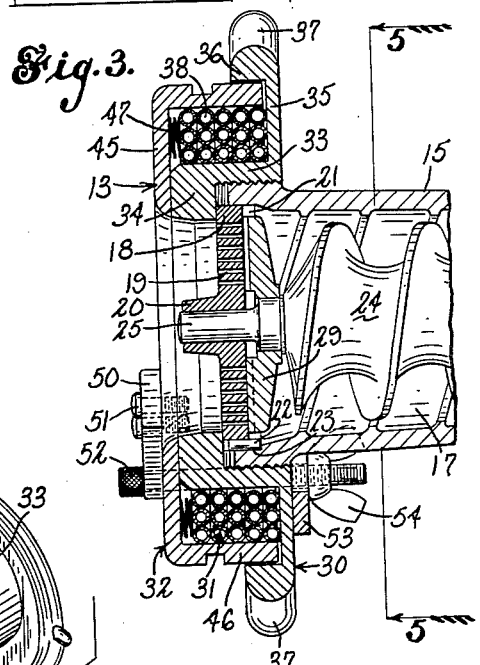
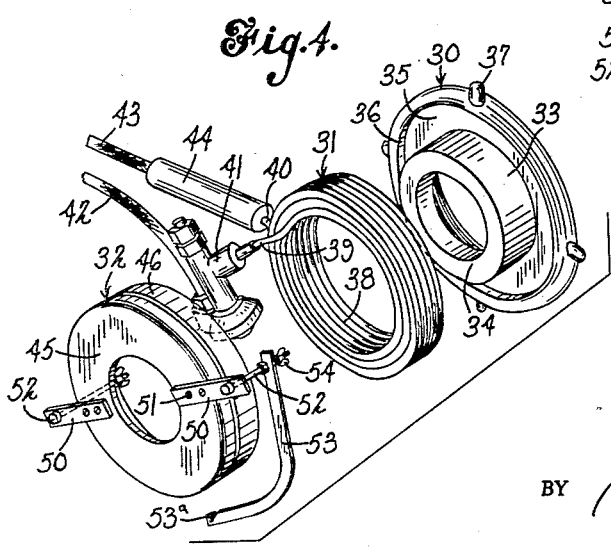
INVENTORS
Richard M. Dwyer and
William H. Pleines
BY Rockwell & Bartholow
ATTORNEY April 5, 1960   R. M. DWYER ET AL   2,931,408
ATTACHMENT FOR REFRIGERATING A MEAT CHOPPER
Filed March 13, 1957   2 Sheets-Sheet 2
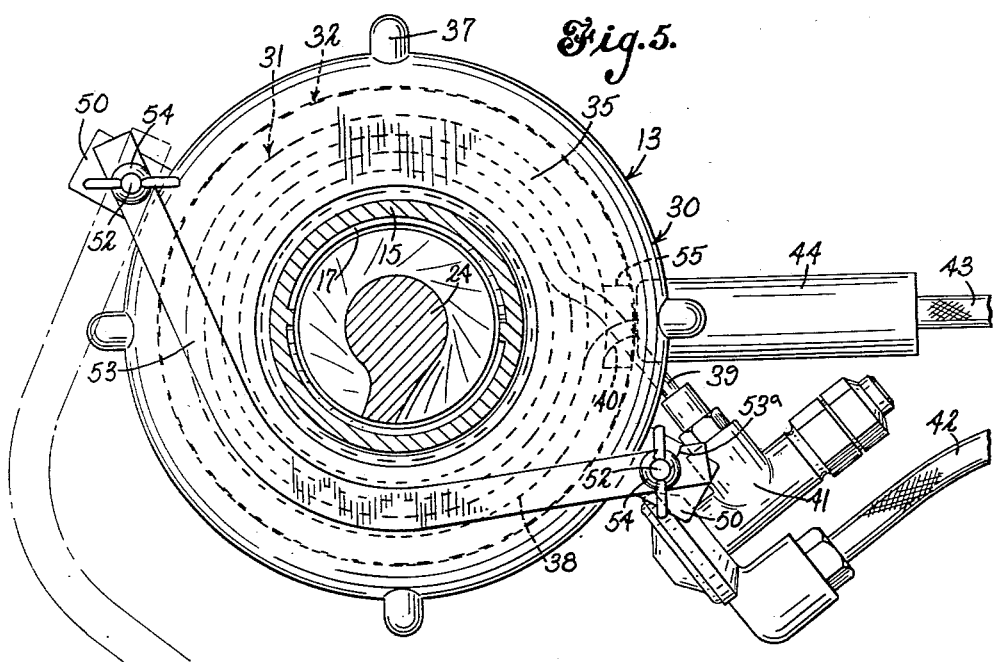
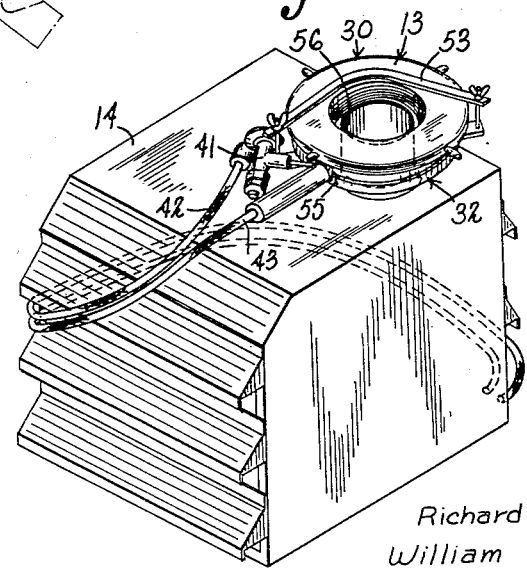
INVENTORS
Richard M. Dwyer and
William H. Pleines
BY Rockwell & Bartholow
ATTORNEY

United States Patent Office 2,931,408
Patented Apr. 5, 1960

2,931,408

ATTACHMENT FOR REFRIGERATING A MEAT CHOPPER

Richard M. Dwyer, Orange, and William H. Pleines, West Haven, Conn., assignors, by mesne assignments, of sixty-six and two-thirds to said Dwyer, and thirty-three and one-third to said Pleines Application March 13, 1957, Serial No. 645,729

4 Claims. (Cl. 146—182)

This invention relates to an attachment for a meat chopper, and relates more particularly to a device for refrigerating a meat chopper or like machine to insure that the meat or other material treated will not be subjected to a rise in temperature, and the deteriorating effects thereof, caused by heat generated therein due to the friction between parts of the chopper, and also due to friction between the material and the chopper. When meat which is being put through a chopper is maintained at a low temperature throughout the chopping operation, the meat retains its natural color and is more pleasing to the eye of the customer. It is well known that when meat is put through a chopper and is not maintained at a low temperature during the operation the meat often turns white or gray and is less pleasing in appearance.

Heretofore some attempts have been made to solve the problem of maintaining meat at a low temperature while grinding or chopping the same. Meat market operators have been known to keep the head or casing of a meat chopper in a refrigerator when the machine is not in use. This practice has obvious drawbacks. For example, long and, in effect, uninterrupted operation of the meat chopper may be required to fill customers' orders. Furthermore, the practice of storing the head or casing of the meat chopper in a refrigerator may be quite inconvenient for the operator. Attempts have also been made to maintain meat at a low temperature during grinding or chopping of the same by employing specially constructed choppers having cooling coils built into the casings of the machines. These specially constructed machines are massive and expensive to produce. Furthermore, the product of known machines of this type has not been completely satisfactory owing, it is believed, to the failure to provide cooling directly to the ring nut or shear plate retained by the nut, usually, if not always, employed in meat choppers.

A chopper is usually provided with a perforated shear plate held in place in the outer or delivery end of the casing in fixed relation to the latter. A knife, angularly rigid with a feed screw cooperates with the inner face of the shear plate to cut meat as it is advanced in the casing to the plate and pushed through the latter. The shear plate is usually held in place by a ring nut on the casing. It will be understood that a considerable amount of friction is created at the delivery end of the machine during the grinding or chopping of meat. Hence it is desirable to cool or refrigerate the ring nut which serves as a retainer for the shear plate and is in direct contact with the latter.

One object of the invention is to provide a novel attachment for a grinder or chopper to cool parts of the same so that the material ground or chopped will not be heated and adversely affected.

A further object of the invention is to provide an attachment such as characterized above, which may be employed on grinders or choppers of conventional design and construction, without the necessity of modifying such machines.

Another object of the invention is to provide an attachment such as characterized above, which may be easily and quickly applied to or removed from a grinder or chopper, which very effectively maintains at desirably low temperatures the material advanced through the chopper, and which is comprised of relatively few and rugged parts and is economical to produce.

Further objects of the invention will appear from the following detailed description of the form of the invention illustrated in the drawings by way of example.

In the accompanying drawings:

Fig. 1 is a side elevational view of a meat chopper having applied thereto an attachment embodying our invention;

Fig. 2 is a front elevational view of the chopper having the attachment applied thereto;

Fig. 3 is an enlarged sectional view on line 3—3 of Fig. 2;

Fig. 4 is an exploded view of the refrigerating or cooling head of the attachment;

Fig. 5 is a view partially in section and taken on line 5—5 of Fig. 3; and

Fig. 6 is a perspective view of the attachment disassociated from the chopper.

In the drawings, the meat chopper is indicated generally at 10; the electric motor, shown diagrammatically, for operating the chopper at 11; the motor stand, shown in the same manner, at 12; the refrigerating or cooling head of the attachment for the chopper at 13; and the compressor and condenser unit of the attachment, connected to the refrigerating head by flexible conduits, at 14.

The meat chopper 10 comprises a casing having an elongate horizontally extending tubular portion 15 and and upright mouth portion or intake 16 adjacent and communicating with one end of what may be termed the feed chamber 17 formed by the casing portion 15. At the remote end of the feed chamber 17 there is provided a shear plate 18 having a plurality of perforations 19 formed therein and having a central outwardly extending boss 20. The shear plate 18 extends into the casing portion 15 and occupies a position at the discharge or delivery part of the chopper. The end of the feed chamber 17 remote from the intake 16 is enlarged, as at 21, to receive the shear plate 18, the plate 18 being axially adjustable in the enlargement 21. To maintain the shear plate in angularly fixed relation to the casing portion 15, the plate 18 has at one point on its periphery a rearwardly projecting pin 22 fixed thereto and extensible into a notch 23 formed in the casing portion 15. A feed screw, indicated at 24, has a forward shaft portion 25 slidably and rotatably received in the boss 20 of the shear plate. The feed screw 24 has a rear shaft portion 26 rotatably mounted in the casing portion 15 and extending without the casing. The shaft portion 26 has at the outer end thereof a part 27 detachably connected to the shaft 28 (shown diagrammatically) of the electric motor 11 so that the feed screw may be driven by the latter when the meat chopper 10 is assembled with the motor 11. The shaft portion 26 is slidably received in the portion 15 of the casing and it will be understood that the feed screw may be removed from the casing with the shear plate for cleaning purposes. Of course the feed screw is also separable from the shear plate. The feed screw 24 is provided with a conventional knife 29 angularly rigid therewith and adjoining the inner end of the shaft portion 25. The knife 29 cooperates with the inner face of the shear plate 18 to cut the material advanced to the plate 18 by the feed screw. It will be understood that the material cut by the knife 29 is forced through the openings 19 in the shear plate by the action of the feed screw.

The refrigerating head 13 of the attachment is received on the forward end of the casing portion 15, the refrigerating head being in embracing relation to the shear plate 18 and extending both forwardly and rearwardly of the latter, as shown in Fig. 3. The refrigerating head is a composite member which, in the illustrated form, is constituted by three separable parts; a ring nut 30, a coil member 31, and a cover member 32. The ring nut 30 is provided with a cylindrical part 33 provided with internal threads engageable with external threads formed on the forward end of the casing portion 15. At the forward end of the part 33 the ring nut is provided with an integral inwardly and circumferentially extending flange 34 overlying and engageable with the forward face of the shear plate 18 throughout a marginal and circumferentially extending portion of the latter. At the other end of the part 33, the ring nut is provided with an integral outwardly and circumferentially extending flange 35. The flange 35 has an outer part (see Fig. 3) which overhangs the cover member 32, as at 36, and the outer part of the flange 35 is provided with a plurality of radially projecting and circumferentially spaced-apart lugs 37 for gripping purposes. The lugs 37 facilitate turning of the ring nut by hand.

The coil member 31 is, in the present instance, formed of tubing, preferably copper. The tubing, indicated at 38, is wound spirally on itself to form; in the instant case, three coils, or layers, one over another (see Fig. 3), each having five turns. The coil member 31 is of a diameter to fit snugly on the cylindrical part 33 of the ring nut and carries refrigerant in the tubing 38. The tubing 38 has an inlet end 39 and an outlet end 40. The turns of each coil of the tubing 38 preferably abut one another and the layers of the tubing 38 abut one another in the preferred form. It may be noted that the innermost coil or layer of the tubing 38 adjoins the inlet 39 so that this coil, the one nearest the shear plate 18, is cooled first and receives the full effect of the coolant. The inlet end 39 of the tubing is connected to the usual expansion valve 41 and to the outlet of the compressor and condenser unit 14 by a flexible conduit 42 which may be of considerable length, if desired. The inlet end of the unit 14 is connected to the outlet end 40 of the tubing through a conduit 43, similar to the conduit 42, and a coupling 44.

The cover member 32 has an annular web portion 45 which, when the member 32 is assembled with the ring nut 30, overlies the flange 34 of the latter and firmly engages the same, as shown in Fig. 3. The cover member 32 is also provided with an integral annular flange 46 which, in the operative position of the member 32, extends snugly over the outermost coil of the tubing 38. As shown in the last-mentioned view, the flange 35 of the ring nut overhangs the flange 46 of the member 32. The cover member 32 is provided with one or more springs to urge the coil member 31 firmly against the flange 35 so that the latter is effectively cooled. In the illustrated form, two helical springs are employed for this purpose, the springs being indicated at 47. The springs 47 are compressed between the web portion 45 and the coil member 31. The springs 47 may be mounted on the web portion 45 by having their forward ends welded to the latter.

The refrigerating or cooling head 13 is provided with clamping means associated with the ring nut 30 and the cover member 32 to releasably secure these parts together when they are assembled on the meat chopper. In the illustrated embodiment, the clamping means comprises a pair of elongate bracket members 50 arranged on a diameter of the cover member 32 and projecting outwardly beyond the flange 46 in opposite directions, the bracket members 50 being secured, as at 51, to the web portion 45 of the cover member. At their outer ends the bracket members 50 are provided with cross bolts 52. Each cross bolt 52 has one end fixed to the outer end of one of the members 50. An elbowed arm 53 is provided having one end thereof pivotally and slidably mounted on one of the cross bolts 52 and having at the other end thereof a notch 53ª to receive the other bolt 52. Wing nuts 54 are provided on the other ends of the cross bolts 52 for the purpose of clamping the arm 53 against the rear face of the ring nut 30. It will be understood that when it is desired to remove the refrigerating head 13 from the meat chopper the nuts 54 are first loosened, and then the arm 53 is swung on its pivotal axis to disengage the notched end of the arm 53 from the corresponding cross bolt 52 and swung to a position to clear the ring nut 30. The cover member 32 may then be removed by sliding the same forwardly, and the coil member 31 may be removed with the cover member 32. It may be noted that the inlet and outlet ends of of the tubing 38 forming the coil member 31 extend through a recess 55 formed in the flange 46 of the cover member. When the members 31 and 32 have been removed or separated from the ring nut 30 in the above-described manner, the coil member 31 may thereafter be removed from the member 32 by merely sliding the two apart. After the members 31, 32 have been separated from the ring nut 30 in the manner described above, the ring nut may be manipulated to unthread and remove the same from the casing portion 15 of the grinder. After the ring nut 30 has been separated from the meat chopper the shear plate 18 and the feed screw 24 may be removed from the chopper for cleaning purposes. When the refrigerating head 13 is removed from the chopper, the parts of the head may be assembled with each other and the head 13 may be slipped over a fixed tubular member 56 (see Fig. 6) projecting upwardly from the compressor and condenser unit 14. The refrigerating head 13 may be conveniently stored in this manner. From the foregoing the manner of reassembling the refrigerating head 13 on the chopper will be manifest. It need only be said that the steps for removing the refrigerating head are followed in reverse order to reassemble the head on the grinding machine. However, it may be noted here that the adjustment of the ring nut on the threaded cylindrical portion of the chopper casing controls the relation of the shear plate to the knife. The ring nut is tightened only to the extent necessary to adjust the relation of the shear plate to the knife 29. From the foregoing it will also be manifest that the part 30, the member 31, and the cover member 32 of the refrigerating head form, in effect, a unitary ring nut which is provided with refrigeration or cooling coils and which may be employed as a substitute for a conventional ring nut on a grinding or chopping machine.

In accordance with the foregoing disclosure, there is provided an attachment for refrigerating a meat chopper or the like to insure that the material treated is maintained at a low temperature so as to tend to avoid the adverse effect of heat on the material caused by heat due to the friction between parts of the chopper, and due also to friction between the material and the chopper. It has been found that this tendency of a chopper to elevate the temperature of the material treated is largely concentrated in the area of the knife and shear plate. In this connection, it is important to note that in accordance with the present disclosure the tubing of the coil member extends not only around the shear plate, but also extends to both sides of the plate to provide an optimum cooling effect on the latter. It has been found that meat ground or chopped in accordance with the disclosure retains its natural color and is more pleasing in appearance.

In accordance with the foregoing disclosure, there is provided a very useful attachment which may be employed on grinders or choppers of conventional design and construction without the necessity of modifying such machines. The refrigerating head of the attachment is merely substituted for the conventional ring nut. There is also provided an attachment which may be easily and quickly applied to and removed from a grinder or chopper, which is comprised of relatively few and simple parts, and which is economical to produce.

While only one form of the refrigerating attachment for a grinder or chopper has been illustrated in the drawings and described above, it will be understood that the attachment is susceptible of various modifications and changes in details without departing from the principles of the invention and the scope of the appended claims.

What we claim is:

1. In an attachment for a meat chopper having a generally cylindrical casing portion provided with an open delivery end and a shear plate extending into said end and having an outer face, a refrigerating head embracing said end of the casing portion and including a retaining ring releasably mounted on said end of the casing portion and provided with an inwardly extending flange of annular form for engagement with said face of the shear plate, said head including means defining a spiral passage for a refrigerant encircling at least a portion of the axial dimension of said ring, in proximity to the shear plate, and having inlet and outlet portions, and the head including means for releasably securing the first-named means to the retaining ring.

2. In an attachment for a meat chopper having a generally cylindrical casing portion provided with an open delivery end and a shear plate extending into said end and having an outer face, a refrigerating head embracing said end of the casing portion and including a retaining ring releasably mounted on said end of the casing portion and provided with an inwardly extending flange of annular form for engagement with said face of the shear plate, said head including means defining a spiral passage for a refrigerant encircling at least a portion of the axial dimension of said ring, in proximity to the shear plate, and having inlet and outlet portions, said spiral passage being formed in a plurality of layers, one radially outward of another, closely adjacent one another, each layer being formed of a plurality of turns axially and closely adjacent one another.

3. In an attachment for a meat chopper having a generally cylindrical casing portion provided with an open delivery end and a shear plate extending into said end and having an outer face, a refrigerating head embracing said end of the casing portion and including a retaining nut threaded on said end of the casing portion and provided with an inwardly extending flange of annular form for engagement with said face of the shear plate, said head including a coil member for a refrigerant constituted by tubing having inlet and outlet portions and encircling at least a portion of the axial dimension of said nut, in proximity to the shear plate, said coil member having a plurality of layers, one radially outward of another, closely adjacent one another, each layer being formed by a plurality of turns axially and closely adjacent one another, and the head also including a cover member extending over the coil member and having means thereon coacting with means on the nut to releasably secure the cover member to the nut.

4. In an attachment for a meat chopper having a casing portion and a shear plate at one end of the latter, a ring nut having an internally threaded part for mounting on the casing portion, the ring nut having at one end of said threaded part thereof an inwardly extending flange of annular form for engagement with the outer face of the shear plate, and the ring nut having at the other end of said threaded part thereof an outwardly extending flange of annular form, a coil member for a refrigerant constituted by tubing and snugly embracing said threaded part of the ring nut and having inlet and outlet portions, a cover member at least partially enclosing said coil member and forming with the ring nut a chamber for the coil member, and a spring between the cover member and the coil member urging the latter against said outwardly extending flange of the ring nut.

References Cited in the file of this patent

UNITED STATES PATENTS

| | | |
|---|---|---|
| 642,813 | Cowen | Feb. 6, 1900 |
| 2,233,987 | Orsini | Mar. 4, 1941 |
| 2,693,835 | Lundell | Nov. 9, 1954 |